(12) United States Patent
Komaki

(10) Patent No.: US 8,322,476 B2
(45) Date of Patent: Dec. 4, 2012

(54) BATTERY SYSTEM WITH BATTERY HOLDERS

(75) Inventor: Tsuyoshi Komaki, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 547 days.

(21) Appl. No.: 12/694,497

(22) Filed: Jan. 27, 2010

(65) Prior Publication Data

US 2010/0187027 A1 Jul. 29, 2010

(30) Foreign Application Priority Data

Jan. 28, 2009 (JP) .................................. 2009-17354

(51) Int. Cl.
*B60R 16/04* (2006.01)
(52) U.S. Cl. ...................... 180/68.5; 429/99; 429/100
(58) Field of Classification Search ................. 180/68.5; 429/99, 100
See application file for complete search history.

(56) References Cited

U.S. PATENT DOCUMENTS

| | | | | |
|---|---|---|---|---|
| 4,129,194 A * | 12/1978 | Hammond et al. | .......... | 180/68.5 |
| 5,593,793 A * | 1/1997 | German | .......... | 429/62 |
| 5,766,801 A * | 6/1998 | Inoue et al. | .......... | 429/99 |
| 6,111,387 A * | 8/2000 | Kouzu et al. | .......... | 320/107 |
| 6,855,448 B2 * | 2/2005 | Kikuchi et al. | .......... | 429/454 |
| 7,144,647 B2 * | 12/2006 | Sugita et al. | .......... | 429/434 |
| 7,531,270 B2 * | 5/2009 | Buck et al. | .......... | 429/120 |
| 7,605,562 B2 * | 10/2009 | Kim | .......... | 320/107 |
| 7,871,723 B2 * | 1/2011 | Ikeda et al. | .......... | 429/159 |
| 7,951,477 B2 * | 5/2011 | Wood et al. | .......... | 429/99 |
| 8,025,118 B2 * | 9/2011 | Scheucher | .......... | 180/68.5 |
| 8,071,234 B2 * | 12/2011 | Okada et al. | .......... | 429/99 |
| 8,212,522 B2 * | 7/2012 | Deal et al. | .......... | 320/116 |
| 2001/0030069 A1 * | 10/2001 | Misu et al. | .......... | 180/68.1 |
| 2008/0280194 A1 * | 11/2008 | Okada | .......... | 429/99 |
| 2008/0318119 A1 * | 12/2008 | Watanabe et al. | .......... | 429/99 |
| 2009/0220852 A1 * | 9/2009 | Fujii | .......... | 429/72 |
| 2010/0151309 A1 * | 6/2010 | Marukawa et al. | .......... | 429/120 |
| 2010/0167115 A1 * | 7/2010 | Okada et al. | .......... | 429/99 |
| 2010/0187027 A1 * | 7/2010 | Komaki | .......... | 180/65.21 |
| 2011/0104543 A1 * | 5/2011 | Kim et al. | .......... | 429/99 |
| 2011/0151298 A1 * | 6/2011 | Kim | .......... | 429/99 |
| 2012/0040237 A1 * | 2/2012 | Hamada et al. | .......... | 429/159 |
| 2012/0141855 A1 * | 6/2012 | Okada et al. | .......... | 429/99 |

FOREIGN PATENT DOCUMENTS

JP 2008-110693 5/2008

* cited by examiner

*Primary Examiner* — Jeffrey J Restifo
(74) *Attorney, Agent, or Firm* — Wenderoth, Lind & Ponack, LLP

(57) ABSTRACT

The connecting bolts 5 are inserted through the connecting cylinders 21 to hold a plurality of battery holders 20 in the stacked configuration and form a battery block 2. The battery holder 20 connecting cylinders 21 are disposed at a plurality of locations on the perimeter of the battery block 2, and are disposed in straight-lines to form rows of partial-stack connecting cylinders 4 on battery holders 20 stacked in two levels or more, but not on the entire stack of battery holders 20. Connecting bolts 5 are inserted through each row of partial-stack connecting cylinders 4 to hold the connecting cylinders 21 that make up each row of partial-stack connecting cylinders 4 in a stacked configuration, and retain the battery holders 20 in a stacked configuration as a battery block 2.

19 Claims, 6 Drawing Sheets

BATTERY SYSTEM WITH BATTERY HOLDERS

BACKGROUND OF THE INVENTION

1. Field of the Invention

The present invention relates to a battery system with a plurality of batteries disposed between a plurality of stacked battery holders, and in particular to a battery system with a plurality of stacked battery holders connected and held in place by bolts.

2. Description of the Related Art

As a battery system housing many batteries capable of being charged, a configuration has been developed that has battery units stacked in a plurality of levels with each battery unit housing many batteries (refer to Japanese Laid-Open Patent Publication 2008-110693).

In this battery system, the number of batteries inside can be increased by increasing the number of levels of stacked battery units. Since this structure can adjust the number of batteries by adjusting the number of battery unit levels, it is suitable for use in applications such as in hybrid cars where the required output is different for different types of vehicles.

The battery system cited in JP 2008-110693 A has connecting bolts that pass through the stacked battery units in the direction of stacking to hold those battery units. The connecting bolts are inserted through the stacked battery units and fastened in place. As shown in FIG. 1, the connecting bolts 95 of this battery system pass through the interior of the battery units 93. Specifically, the connecting bolts 95 pass through a plurality of locations interior to the perimeters of the battery units 93. In this type of battery system, since connecting bolts 95 pass through the interior of the battery units 93, space for connecting bolt 95 insertion must be allocated between adjacent batteries. If many connecting bolts are used to tightly connect the battery units, the battery unit outline (footprint) becomes larger. In addition, a battery system of this structure has the drawback that because connecting bolts are disposed at the interior of the battery units, it is difficult to join the battery units with their peripheries tightly connected. In particular, if connecting bolts are strongly tightened to solidly attach the battery units, battery unit center regions can indent making tight connection at the peripheries even more difficult. This drawback becomes more serious when many batteries are disposed in a single plane and battery unit outline becomes large.

To tightly connect battery unit peripheries, a structure can be adopted that has connecting bolts at the battery unit perimeters. In this structure, connecting cylinders are established in single-piece construction with the battery units in a plurality of locations on battery unit perimeters and extending in the direction of battery unit stacking. Connecting bolts are inserted through the connecting cylinders to connect the battery units. A battery system with this structure has the characteristic that since stacked battery units are connected by connecting bolts inserted through connecting cylinders established at battery unit perimeters, battery units can be reliably joined while tightly connecting their perimeters. However, in a battery system of this structure, if the number of stacking levels becomes large, the connecting bolts that hold the structure together become long. To reliably hold battery units stacked in many levels, it is necessary to increase the diameter of the long connecting bolts. This is because long thin connecting bolts can stretch, and battery units stacked in many levels cannot be tightly retained over a long period without loosening. However, if connecting bolt diameter is increased, connecting cylinders must be made wider and battery unit outline increases. This is because wide connecting cylinders protrude out from the perimeters of the battery units. In addition, in a configuration that disposes bus-bars at battery unit perimeters to connect the batteries in series or parallel, many wide connecting cylinders protruding from bus-bar perimeters has the drawback that those connecting cylinders can interfere with bus-bar locations.

The present invention was developed with the object of correcting the drawbacks described above. Thus, it is an important object of the present invention to provide a battery system that can tightly and reliably hold battery unit perimeters together without increasing battery unit outline.

SUMMARY OF THE INVENTION

The battery system of the present invention has battery holders 20 stacked in three or more levels to dispose batteries 1 in fixed positions. The stacked battery holders 20 are held in place by connecting bolts 5 inserted in the stacking direction, and connecting cylinders 21 are provided in the stacking direction at battery holder 20 perimeters for insertion of the connecting bolts 5. Connecting bolts 5 are inserted through the connecting cylinders 21 to hold a plurality of battery holders 20 in a stacked configuration and form a battery block 2, 32. Connecting cylinders 21 established on the perimeters of the battery holders 20 are disposed at a plurality of locations on the perimeter of the battery block 2, 32. Further, connecting cylinders 21 disposed on the battery block 2, 32 perimeter are configured as rows of partial-stack connecting cylinders 4, 34 disposed in straight-lines on two or more levels of battery holders 20 but not on the entire stack of battery holders 20. Connecting bolts 5 are inserted through connecting cylinders 21 that make up each row of partial-stack connecting cylinders 4, 34 to join the connecting cylinders 21 in a stacked configuration and hold the battery holders 20 in a stacked configuration as a battery block 2, 32.

The battery system described above has the characteristic that the perimeter of the battery block can be tightly and reliably held together without increasing the outline (footprint) of the battery block. This is because a single connecting bolt does not connect all stacked battery holder levels, but rather connects a number of battery holder levels that is less than the entire stack. For example, the battery system of FIG. 3 has six levels of battery holders 20, but a single connecting bolt 5 is inserted through connecting cylinders 21 established on four levels of battery holders 20 to hold those four levels together. These connecting bolts 5 can be made shorter than connecting bolts made for insertion through connecting cylinders of six battery holders levels. Short connecting bolts can hold four levels of battery holders over a long period without loosening and without increasing connecting bolt diameter. As shown in FIGS. 3 and 4, although a single connecting bolt does not extend to hold all battery holder levels in a stack, a single connecting bolt 5 can connect four upper level battery holders 20, and a single connecting bolt 5 can connect four lower level battery holders 20. Consequently, all battery holder 20 levels can be retained in a stack via the two mid-level battery holders 20.

The rows of partial-stack connecting cylinders 4, 34 in the battery system of the present invention can be made up of rows of upper connecting cylinders 4A, 34A and rows of lower connecting cylinders 4B, 34B. The upper connecting cylinders 4A, 34A are a plurality of connecting cylinders 21 disposed on the perimeters of a plurality of battery holders 20 and extending in the direction of battery holder stacking in straight-lines from the upper surface of the battery block to an intermediate level. The lower connecting cylinders 4B, 34B are a plurality of connecting cylinders 21 disposed on the perimeters of a plurality of battery holders 20 and extending in the direction of battery holder stacking in straight-lines from the lower surface of the battery block to an intermediate level. In this battery system, battery holders 20 stacked in the middle of the battery block 2, 32 have both upper connecting cylinders 4A, 34A and lower connecting cylinders 4B, 34B established on their perimeters. Connecting bolts 5 can be inserted through the upper connecting cylinders 4A, 34A and the lower connecting cylinders 4B, 34B to join all the battery holders 20.

The battery system described above can solidly retain many battery holders with the rows of upper connecting cylinders and lower connecting cylinders. Further, where upper connecting cylinders are disposed, a region with no protrusions is established below those connecting cylinders. Where lower connecting cylinders are disposed, a region with no protrusions is established above those connecting cylinders. Consequently, by disposing bus-bars in those regions with no protrusions, battery system outline can be reduced.

In the battery system of the present invention, upper connecting cylinders 4A, 34A and lower connecting cylinders 4B, 34B can be alternately disposed around the perimeter of the battery block 2, 32. By alternately disposing upper connecting cylinders and lower connecting cylinders, the battery block of this battery system can be retained more robustly.

In the battery system of the present invention, main bolts 6 that have a larger diameter than the connecting bolts 5 can be inserted through all the battery holders 20. These main bolts 6 can be inserted through all the stacked battery holders 20 to retain all those battery holders 20 in the stacked configuration.

In the battery system described above, since the stacked battery holders are held by both connecting bolts and main bolts, many battery holders can be retained more solidly. Further, since battery holder perimeters are joined by connecting bolts, the number of main bolts can be reduced, or the diameter of the main bolts can be reduced. Consequently, the stacked battery holders can be solidly retained while reducing the space required for the main bolts. Specifically the stacked battery holders can be solidly retained while reducing the outline (footprint) of the battery system. Further, in this battery system, connecting bolts provided at the perimeter can be additionally tightened after the battery holders have been solidly joined by the large diameter main bolts. As a result, connecting bolts can be fastened more tightly to solidly retain many battery holders. In addition, since the connecting bolts can be additionally tightened, this battery system has the characteristic that connecting bolt loosening due to conditions such as vibration can be effectively prevented.

The battery system of the present invention can have a base plate 8 disposed at the bottom surface of the battery block 2, and main bolts 6 can insert through the base plate 8 to attach the battery block 2 to the base plate 8. In this battery system, since the battery block is attached to the base plate by the main bolts, the battery block can be solidly attached to the base plate.

In the battery system of the present invention, battery modules 10, which have a plurality of circular cylindrical batteries connected in a straight-line, can be arranged in parallel orientation between a pair of battery holders 20 to form a battery unit 3. In this battery system, many circular cylindrical batteries can be sandwiched between a pair of battery holders and held in fixed positions. Configured as battery modules, which are made up of the circular cylindrical batteries, sandwiched between a pair of battery holders, a thin battery unit can be produced. Consequently, many battery units can be stacked together for an overall thin battery system containing many batteries.

In the battery system of the present invention, battery holder 20 side-walls can be provided with electrode windows 26 to allow battery module 10 electrodes 12 to project outside the battery holders 20. Bus-bars 13 can be connected to the battery module 10 electrodes 12 that project outside the battery holders 20 to electrically connect adjacent battery modules 10. In this battery system, electrodes projecting from the electrode windows can be connected via bus-bars to electrically connect the battery modules. Further, this battery system has the characteristic that bus-bars can be easily connected with the battery units containing battery modules and held together by connecting bolts.

The above and further objects of the present invention as well as the features thereof will become more apparent from the following detailed description to be made in conjunction with the accompanying drawings.

DETAILED DESCRIPTION OF THE EMBODIMENT(S)

Figure 1:
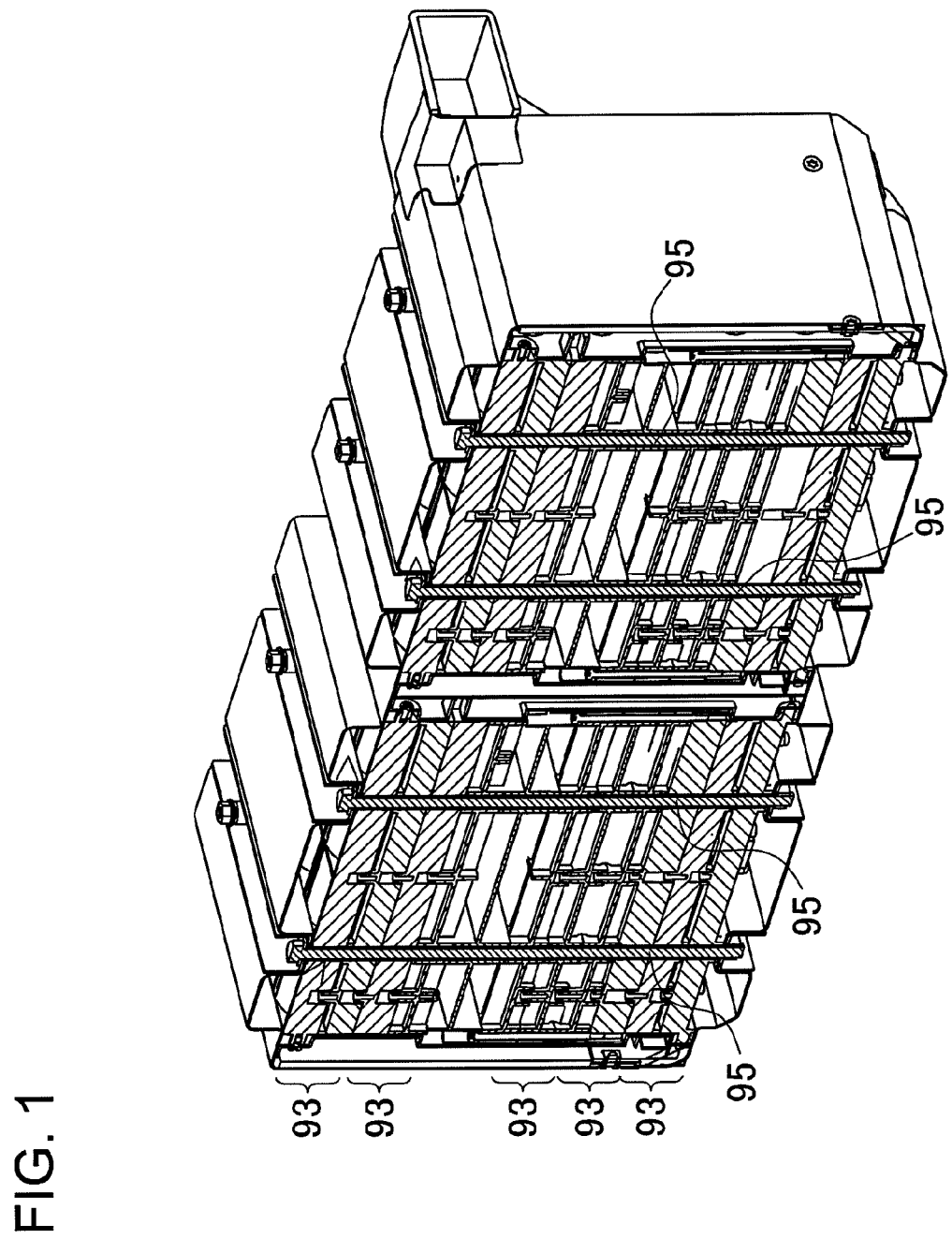
FIG. 1 is an oblique cross-section view of a prior art battery system.

The following describes embodiments of the present invention based on the figures.

The battery system shown in FIGS. 2-5 is used as a power source apparatus in a hybrid car, and it supplies power to an electric motor that drives the vehicle. However, the battery system of the present invention is not limited to hybrid car power source apparatus applications. The battery system of the present invention can also be used in electrically powered vehicles such as electric automobiles (electric vehicles) or plug-in hybrid cars, or in other power source apparatus applications that require a large output.

As shown in the figures, six levels of battery holders 20 are retained in a stack to form a battery block 2. Since batteries 1 are disposed between a pair of battery holders 20, two battery holder 20 levels make up a single battery unit 3. Consequently, this battery system has six levels of battery holders 20 and three levels of battery units 3 held in a stacked configuration. Although the battery system of the figures has batteries 1 disposed between a pair of battery holders 20 and two battery holder 20 levels make up a single battery unit 3 level, batteries can also be housed in a single battery holder level and one battery holder level can make up one battery unit level. For a battery holder that houses batteries in a single level, battery holders can be stacked in three levels to make a three level stack of battery units. The battery system of the present invention has three or more battery holders 20 stacked together, and connecting bolts 5 are inserted through connecting cylinders 21 established on battery holder 20 perimeters to retain the stacked configuration. Nuts 15 are tightened onto the ends of the connecting bolts 5 to fasten the plurality of connecting cylinders 21.

Figure 2:
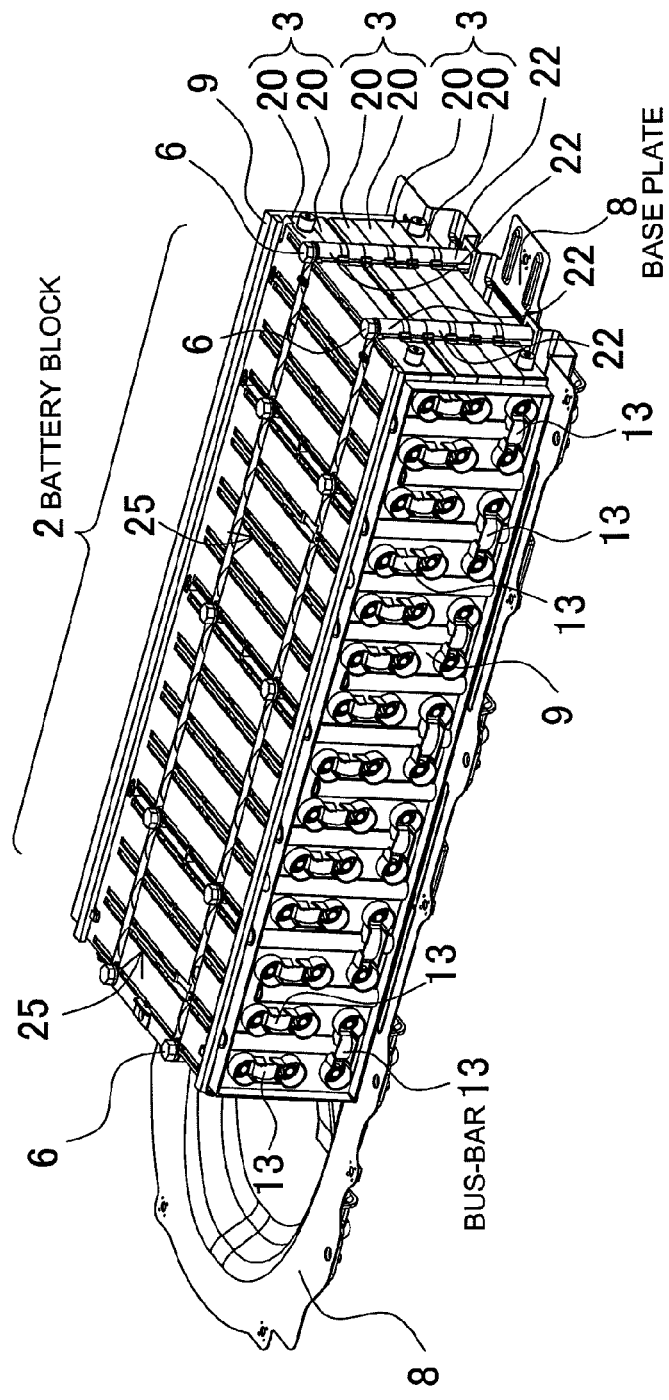
FIG. 2 is an oblique view of a battery system for one embodiment of the present invention.
Figure 3:
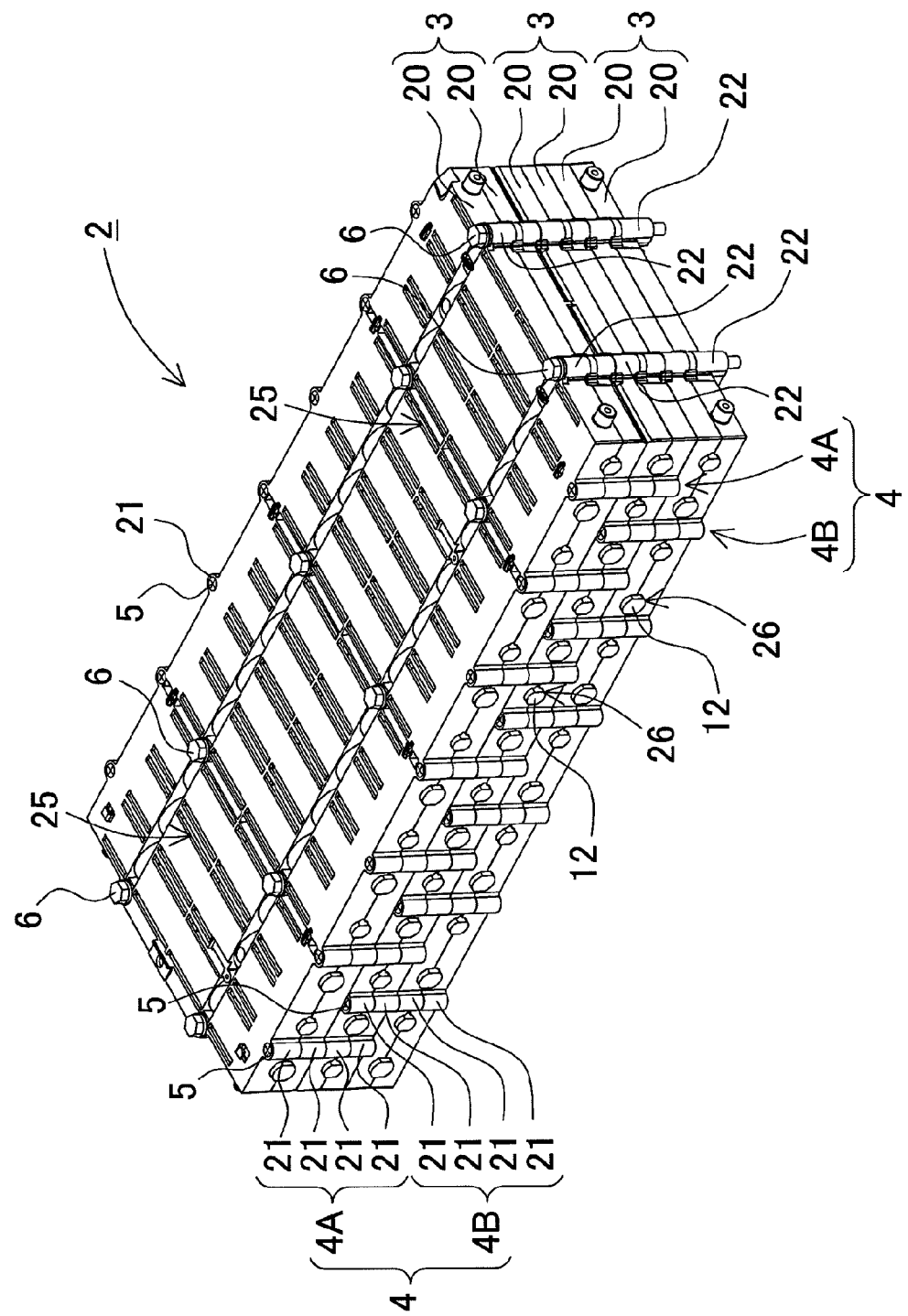
FIG. 3 is an oblique view of the battery block of the battery system shown in FIG. 2.
Figure 4:
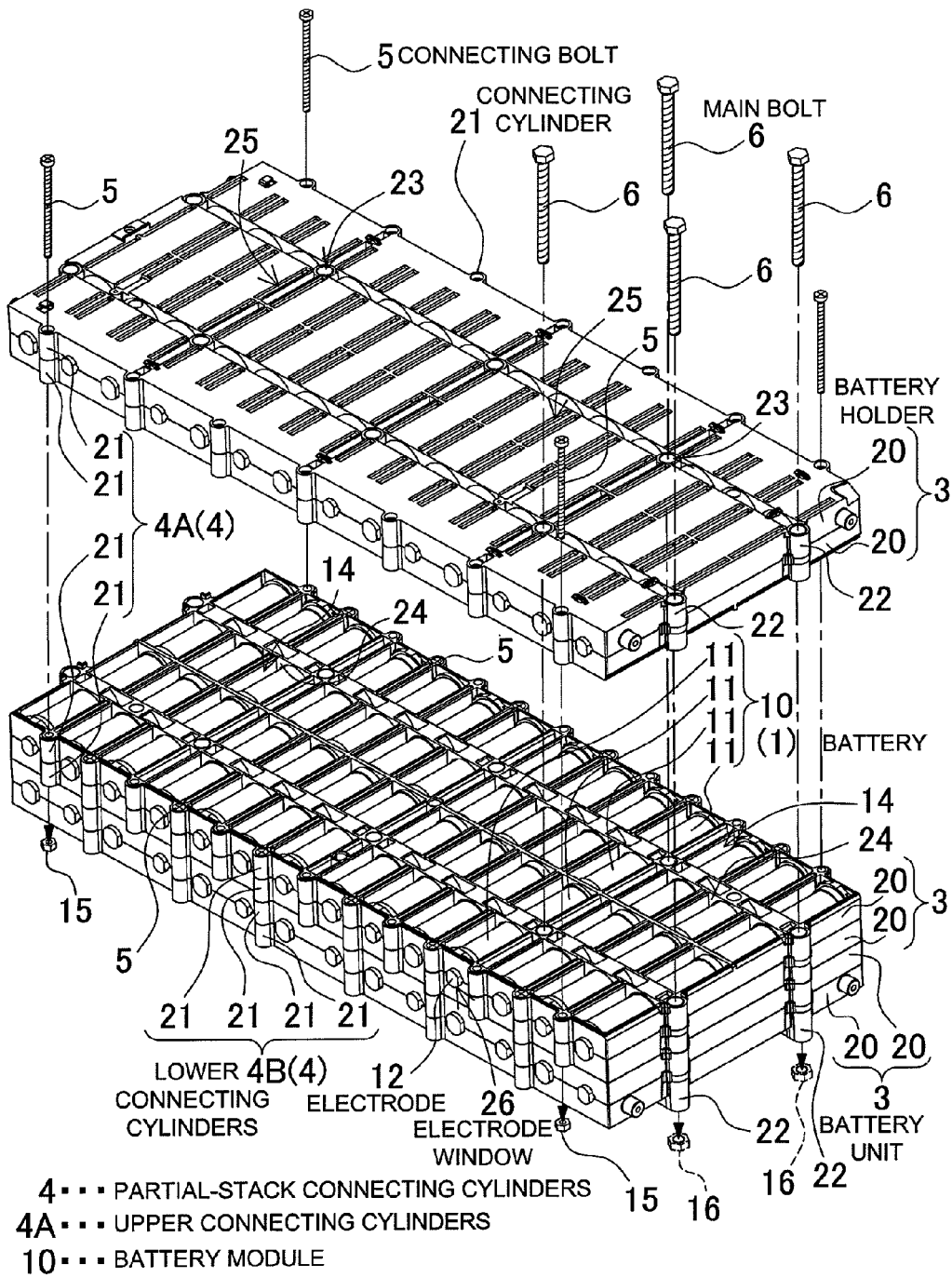
FIG. 4 is an exploded oblique view of the battery block shown in FIG. 3.
Figure 5:
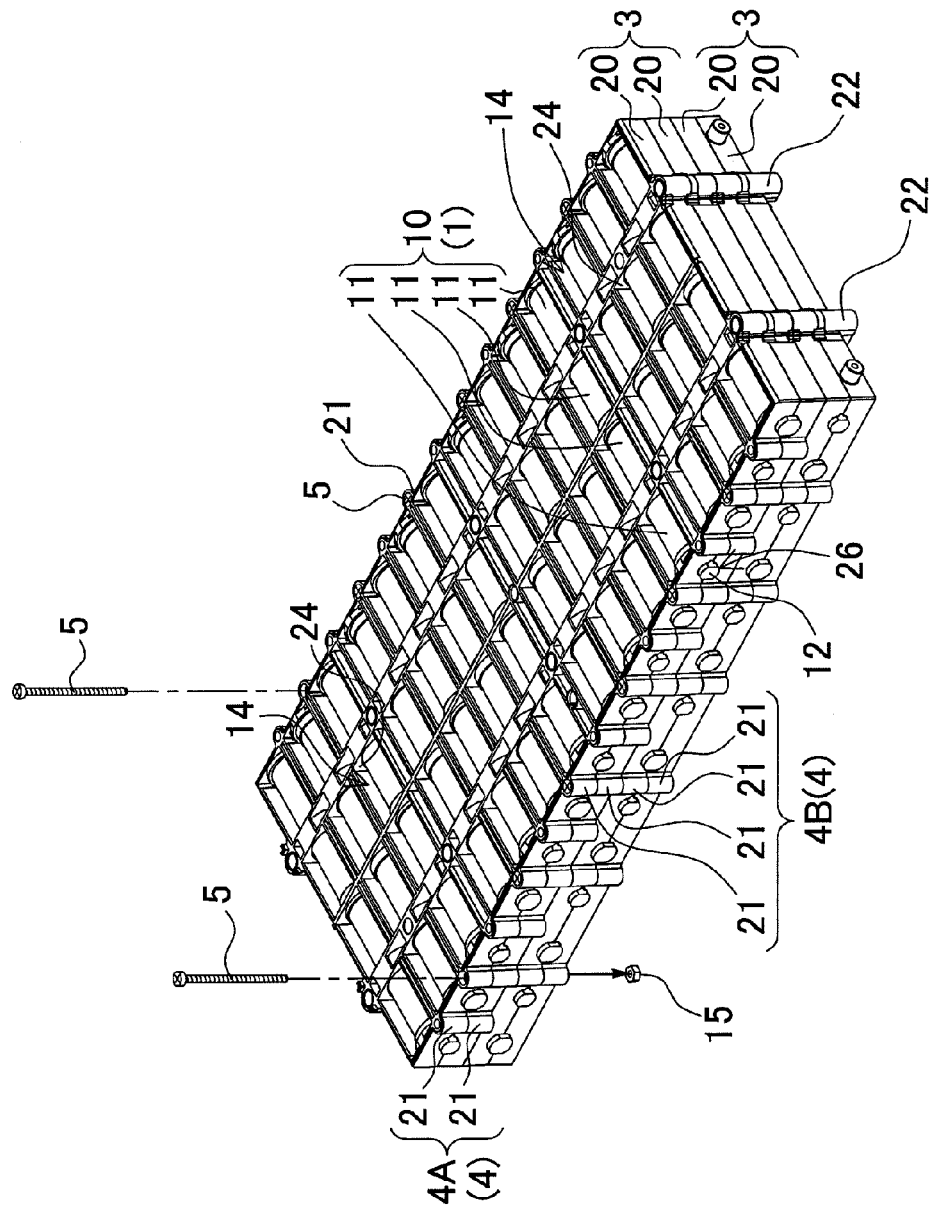
FIG. 5 is an oblique view of the battery block shown in FIG. 4 with the upper level battery unit removed.

The battery system of FIGS. 3 and 4 has three battery unit 3 levels held in a stacked configuration to form a battery block 2. Each battery unit 3 has a plurality of batteries 1 disposed in a single plane between a pair of battery holders 20. The plurality of batteries 1 disposed in a single plane are sandwiched in fixed positions by battery holders 20 above and below. FIG. 5 is an oblique view showing the battery block 2 with the upper level battery unit 3 removed. In the battery system shown in FIG. 5, a plurality of battery cells 11 are joined in a straight-line to form a long narrow battery module 10, and a plurality of battery modules 10 are arranged in parallel orientation in a single plane. Those battery modules 10 are sandwiched from above and below by battery holders 20 and held in fixed positions. The battery cells 11 that make up a battery module 10 are circular cylindrical nickel hydride batteries. However, the battery cells 11 that make up a battery module 10 can be any type of batteries that can be charged such as lithium ion batteries or nickel cadmium batteries. A battery module 10 in the figures has a plurality of battery cells 11 arranged in a straight-line and electrically connected in series. Electrodes 12 at both ends of the battery modules 10 project outside the battery holders 20. The battery holders 20 of the figures are provided with electrode windows 26 to expose battery module 10 electrodes 12, and battery module 10 electrodes 12 project to the outside from those electrode windows 26. As shown in FIG. 2, battery module 10 electrodes 12 that project outside the battery holders 20 are connected to metal-plate bus-bars 13. Bus-bars 13 connect electrodes 12 at both ends of adjacent battery modules 10 to connect each battery module 10 in series and increase output voltage. However, bus-bars can also connect battery modules in series and parallel to increase current capacity as well as output voltage. Although the battery modules 10 in the battery system of FIG. 5 have four battery cells 11 joined in a straight-line, a battery module can also have three or fewer battery cells joined in a straight-line or five or more battery cells joined in a straight-line.

Battery modules 10, which have a plurality of battery cells 11 joined in a straight-line, are sandwiched by battery holders 20 to hold the battery modules 10 in fixed positions. Specifically, battery holders 20 sandwich from above and below the ends of each battery cell 11, which are the battery cell connecting regions of a battery module 10, and the ends of each battery module 10. To hold the battery modules 10 in place, battery holders 20 are provided with retaining projections 24 protruding from the inside surfaces of the battery holders 20 that press on the surface of each battery module 10. Retaining projections 24 are provided in locations that press on the connecting regions of the battery modules 10. Cooling gaps 14 are established between the battery holders 20 and battery cell 11 mid-regions between the retaining projections 24. Batteries 1 are cooled by forced air ventilation through the cooling gaps 14. As shown in FIG. 3, the battery holder 20 on the top level of the stack is provided with cooling slits 25 that connect with the cooling gaps 14 for forced ventilation through the cooling gaps 14. To cool the battery modules 10, cooling air is forced through cooling slits 25 in the upper surface of the battery block 2 and out cooling slits 25 in the bottom surface of the battery block 2.

The battery unit 3 described above has a plurality of battery modules 10, which have a plurality of battery cells 11 joined in a straight-line, disposed between a pair of battery holders 20. However, instead of a plurality of batteries joined in a straight-line as battery modules, single batteries can also be disposed between a pair of battery holders and held in fixed positions.

A plurality of battery units 3 is stacked together to form a battery block 2. The battery system of FIGS. 3 and 4, has battery units 3 stacked in three levels to form a battery block 2. A battery block can also have battery units stacked in two levels or in four or more levels.

A battery block 2 has battery holders 20 stacked in a plurality of levels and held together in the stacked configuration by connecting bolts 5. The connecting bolts 5 are inserted in the direction of battery holder 20 stacking to hold the battery holders 20 in the stacked configuration. To allow bolt 5 insertion, battery holders 20 are provided with connecting cylinders 21 at a plurality of locations on their perimeters and connecting bolts 5 are inserted through those connecting cylinders 21. The battery holders 20 are fabricated by molding insulating plastic. A plastic battery holder 20 is molded as a single-piece with connecting cylinders established at its perimeter. Battery units 3 are held together in a stacked configuration by connecting bolts 5 inserted through the connecting cylinders 21.

A battery holder 20 has connecting cylinders 21 established at a plurality of locations protruding from its perimeter. The battery block 2 of FIG. 3 has connecting cylinders 21 established on both sides and extending in the direction of battery holder 20 stacking. The battery block 2 of FIG. 3 has seven connecting cylinders 21 provided on both sides of the two upper level battery holders 20 of the stack, thirteen connecting cylinders 21 provided on both sides of the two battery holders 20 stacked at mid-level, and six connecting cylinders 21 provided on both sides of the two bottom level battery holders 20. Connecting cylinders 21 on the two upper level battery holders 20 and the two mid-level battery holders 20 co-align to stack in straight-lines and form upper connecting cylinder 4A rows of partial-stack connecting cylinders 4. Connecting cylinders 21 on the two bottom level battery holders 20 and the two mid-level battery holders 20 co-align to stack in straight-lines and form lower connecting cylinder 4B rows of partial-stack connecting cylinders 4. In the battery block 2 of the figures, the perimeters of the two battery holders 20 stacked at mid-level are provided with both upper connecting cylinders 4A and lower connecting cylinders 4B. In this battery block 2, connecting bolts 5 are inserted through the upper connecting cylinders 4A and the lower connecting cylinders 4B to retain all the battery holders 20.

In the battery block 2 of the figures, a single row of partial-stack connecting cylinders 4 is made up of four connecting cylinders 21 provided on four battery holder 20 levels. In this battery block 2, a connecting bolt 5 is inserted through each row of partial-stack connecting cylinders 4 to retain four battery holder 20 levels with connecting bolts 5. Specifically, the upper four levels of battery holders 20 can be held together with one connecting bolt 5, and the lower four levels of battery holders 20 can be held together with one connecting bolt 5. Since the two mid-level battery holders 20 are held together with both the upper level and lower level battery holders 20, the upper two battery holder 20 levels and the lower two battery holder 20 levels are held together in a stack via the two mid-level battery holders 20.

The battery block 2 of FIG. 3 has rows of upper connecting cylinders 4A and lower connecting cylinders 4B disposed alternately on both sides of the perimeter to solidly hold all the battery holders 20. A row of partial-stack connecting cylinders 4 is not a single row of connecting cylinders 21 established on all battery holder 20 levels. The battery block 2 of FIG. 3 has battery holders 20 stacked in six levels, but a row of partial-stack connecting cylinders 4 is made up of four connecting cylinders 21 established on four battery holder 20 levels. Since a row of partial-stack connecting cylinders 4 is not a straight-line arrangement of connecting cylinders 21 spanning all battery holder 20 levels, a connecting bolt 5 inserted through a row of partial-stack connecting cylinders 4 is shorter than a connecting bolt for insertion through connecting cylinders established on all battery holder levels. Consequently, a battery block 2 is configured with rows of partial-stack connecting cylinders 4 that are straight-line arrangements of connecting cylinders 21 on two or more battery holder 20 levels but on fewer than all battery holder 20 levels. A connecting bolt 5 is inserted through each row of partial-stack connecting cylinders 4, each connecting bolt 5 holds together the stack of connecting cylinders 21 that form a partial-stack connecting cylinder 4 row, and this retains the battery holders 20 in a stack. However, in the battery system of the present invention, it is not necessarily a requirement for all the connecting cylinders to be disposed as partial-stack connecting cylinders. Here, some of the connecting cylinders can also be arranged in a single row in the stacking direction spanning all battery holder levels, and a single connecting bolt can connect all the battery holders. This is because battery holders solidly held together by the connecting cylinders that make up partial-stack connecting cylinders can be further retained by long thin connecting bolts inserted through connecting cylinders on all battery holder levels.

Figure 6:
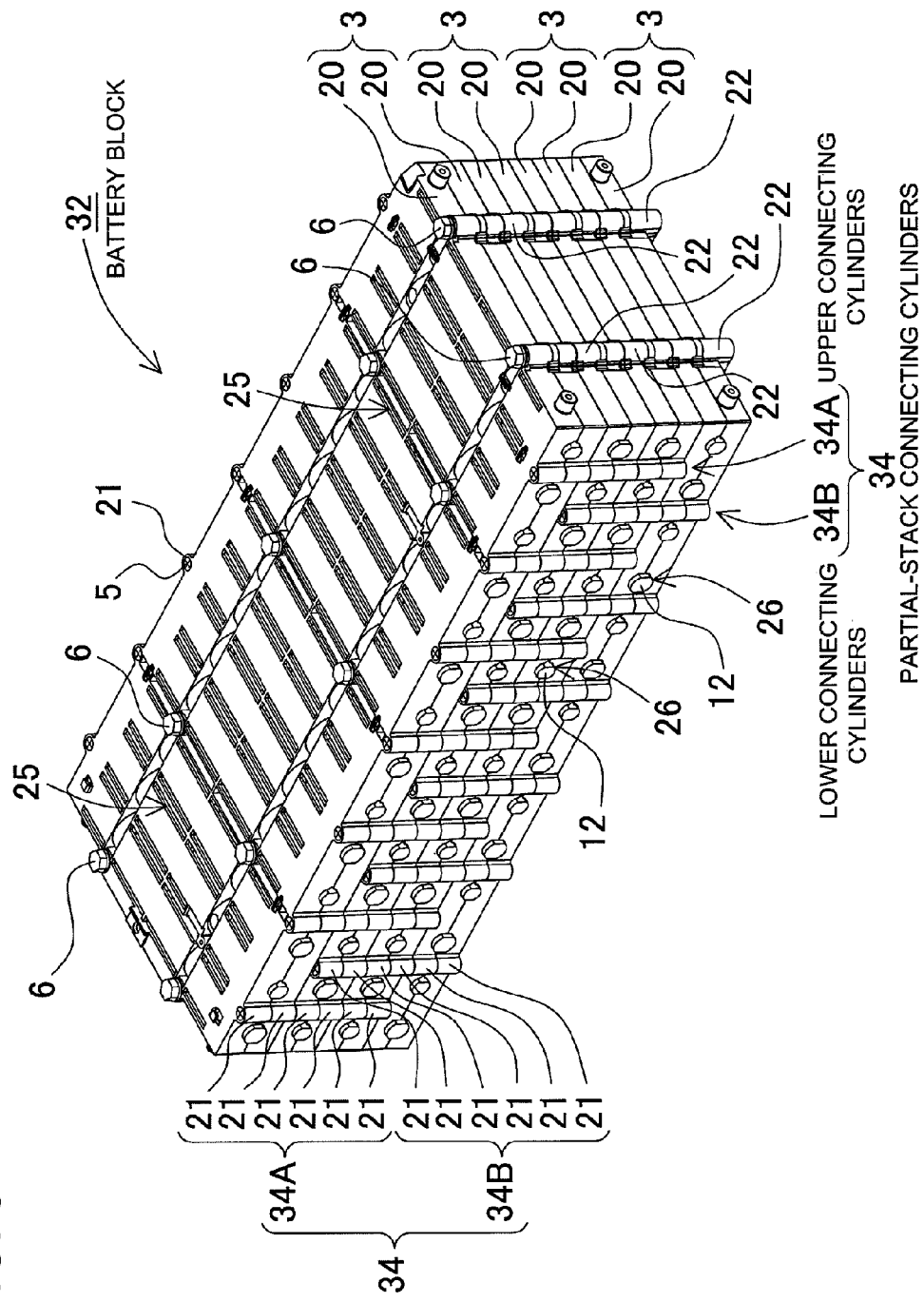
FIG. 6 is an oblique view showing another example of a battery block.

Turning to FIG. 6, a battery block 32 is shown that has four battery units 3 stacked together. The battery block 32 of FIG. 6 has battery holders 20 held together in a stack of eight levels by connecting bolts 5. The battery block 2 of FIG. 6 has seven connecting cylinders 21 provided on both sides of the two upper level battery holders 20 of the stack, thirteen connecting cylinders 21 provided on both sides of the four battery holders 20 stacked at mid-level, and six connecting cylinders 21 provided on both sides of the two bottom level battery holders 20. Connecting cylinders 21 on the two upper level battery holders 20 and the four mid-level battery holders 20 co-align to stack in straight-lines and form upper connecting cylinder 34A rows of partial-stack connecting cylinders 34. Connecting cylinders 21 on the two bottom level battery holders 20 and the four mid-level battery holders 20 co-align to stack in straight-lines and form lower connecting cylinder 34B rows of partial-stack connecting cylinders 34. The perimeters of the four battery holders 20 stacked at mid-level are provided with both upper connecting cylinders 34A and lower connecting cylinders 34B.

In the battery block 32 of FIG. 6, a row of partial-stack connecting cylinders 34 is formed by six connecting cylinders 21 established on six levels of battery holders 20. In this battery block 32, a connecting bolt 5 is inserted through each row of partial-stack connecting cylinders 34, which are upper connecting cylinders 34A and lower connecting cylinders 34B, to retain six battery holder 20 levels with connecting bolts 5. Specifically, the upper six levels of battery holders 20 can be held together with one connecting bolt 5, and the lower six levels of battery holders 20 can be held together with one connecting bolt 5. Since the four mid-level battery holders 20 are held together with both the upper level and lower level battery holders 20, the upper two battery holder 20 levels and the lower two battery holder 20 levels are held together in a stack via the four mid-level battery holders 20.

In the battery block 2 of FIG. 3, a plurality of main bolts 6 are inserted in the direction of battery holder 20 stacking. The main bolts 6 hold together all of the stacked battery holders 20. Consequently, the main bolts 6 have a larger diameter than the connecting bolts 5. For example, in a battery system used as a power source apparatus on-board a vehicle, large diameter M8 bolts can be used as main bolts 6 and M4 to M5 bolts that are narrower than the main bolts 6 can be used as connecting bolts 5.

The battery block 2 of FIG. 3 has battery holders 20 retained by ten main bolts 6 disposed in two rows along the lengthwise direction of the battery block 2. Since four of the main bolts 6 are disposed at the ends of the battery block 2, connecting cylinders 22 for main bolt 6 insertion are formed in single-piece construction with the battery holders 20 protruding from both ends of the battery holders 20. The connecting cylinders 22 provided at both ends of the battery holders 20 are established in two rows at the same locations on all the battery holders 20. Main bolts 6 are inserted through the two rows of connecting cylinders 22 disposed on all the battery holders 20 to retain all levels of battery holders 20 in a stacked configuration. In addition, six main bolts 6 are inserted through the interior of the battery block 2 to hold all the battery holders 20 in a stacked configuration. As shown in FIG. 4, through-holes 23 are provided through the interior of the battery holder 20 in the stacking direction to accept main bolt 6 insertion.

Turning to FIG. 2, a base plate 8 is disposed on the bottom surface of the battery block 2. The base plate 8 is a heavy-duty metal plate, and main bolts 6 are inserted through the base plate 8 to mount the battery block 2 on the base plate 8. The base plate 8 has nuts 16 mounted on its bottom surface for screwing the main bolts 6 into the base plate 8. However, the main bolts can also be screwed into nuts disposed under the base plate to fasten the battery block to the base plate.

The battery block 2 of FIG. 2 has endplates 9 formed from insulating plastic that attach to cover both sides of the battery block 2. Battery electrodes 12 protrude through those endplates 9 and bus-bars 13 are disposed outside the endplates 9 to electrically connect the batteries 1. However, in this battery system, bus-bars can also be disposed between the battery block and the endplates to connect the batteries. In addition, the battery block 2 of FIG. 2 is housed in an external case that is not illustrated, and the assembly is installed, for example, on-board a vehicle.

The battery system described above is assembled by the following steps.

(1) batteries 1 are disposed between pairs of battery holders 20 to form battery units 3. A plurality of battery units 3 is stacked in a plurality of levels. In this configuration, connecting bolts 5 are inserted through the connecting cylinders 21 that form rows of partial-stack connecting cylinders 4. Nuts 15 are screwed onto the ends of the connecting bolts 5 to retain the stacked battery holders 20 as a battery block 2.

(2) The battery block 2 is placed on the base plate 8 and the main bolts 6 are screwed into the base plate 8 nuts 16. This attaches the battery block 2 to the base plate 8 and also holds all the battery holders 20 in the stacked configuration. The main bolts 6 are larger in diameter than the connecting bolts 5, and battery holders 20 are fastened to the base plate 8 with a large tightening torque. For example, the main bolts 6 are tightened with a torque of 12 N/m to 13 N/m. After the main bolts 6 have been tightened, the connecting bolts 5 are re-tightened to more reliably fasten all the battery holders 20 together.

(3) Next, endplates 9 are attached to both sides of the battery block 2. Bus-bars 13 are attached to battery 1 electrodes 12 protruding from the endplates 9 to connect the batteries 1 in series, or in series and parallel. For a battery system used as an automotive power source apparatus, a unit such as a case housing control circuitry is connected after assembly by the previous steps. Finally, the system is loaded into an external case an installed on-board a vehicle.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2009-17354 filed in Japan on Jan. 28, 2009, the content of which is incorporated herein by reference.

What is claimed is:

1. A battery system comprising:
    battery holders stacked in three levels or more to hold batteries in fixed positions; and
    connecting bolts inserted in the direction of battery holder stacking to hold the stacked battery holders together,
    wherein connecting cylinders are established on the perimeters of the battery holders to accept the connecting bolts inserted in the direction of battery holder stacking,
    wherein the connecting bolts are inserted through the connecting cylinders to hold a plurality of battery holders in the stacked configuration and form a battery block,
    wherein the connecting cylinders established on the perimeters of the battery holders are disposed at a plurality of locations on the perimeter of the battery block,
    wherein the connecting cylinders established on the perimeter of the battery block are disposed in straight-lines to form rows of partial-stack connecting cylinders on battery holders stacked in two levels or more, but not on the entire stack of battery holders, and
    wherein the connecting bolts are inserted through each row of partial-stack connecting cylinders to hold the connecting cylinders that make up each row of partial-stack connecting cylinders in a stacked configuration, and retain the battery holders in a stacked configuration as a battery block.

2. The battery system as cited in claim 1 wherein the rows of partial-stack connecting cylinders are made up of rows of upper connecting cylinders, which are a plurality of connecting cylinders disposed on the perimeters of a plurality of battery holders extending in straight-lines in the direction of battery holder stacking from the upper surface of the battery block to an intermediate level, and rows of lower connecting cylinders, which are a plurality of connecting cylinders disposed on the perimeters of a plurality of battery holders extending in straight-lines in the direction of battery holder stacking from the lower surface of the battery block to an intermediate level,
    wherein the battery holders stacked at battery block mid-level have both upper connecting cylinders and lower connecting cylinders established on their perimeters; and connecting bolts are inserted through the upper connecting cylinders and the lower connecting cylinders to hold all the battery holders 20.

3. The battery system as cited in claim 2 wherein the battery block is a stack of six levels of battery holders; one row of partial-stack connecting cylinders is made up of four connecting cylinders established on four levels of battery holders; one connecting bolt can hold the upper four battery holder levels together; and one connecting bolt can hold the lower four battery holder levels together.

4. The battery system as cited in claim 2 wherein the battery block is a stack of eight levels of battery holders; connecting cylinders on the two upper level battery holders and the four mid-level battery holders are disposed in straight-lines at the same locations to form rows of partial-stack connecting cylinders that are the upper connecting cylinders; connecting cylinders on the two bottom level battery holders and the four mid-level battery holders are disposed in straight-lines at the same locations to form rows of partial-stack connecting cylinders that are the lower connecting cylinders; the perimeters of the four battery holders stacked at mid-level are provided with both upper connecting cylinders and lower connecting cylinders; one row of partial-stack connecting cylinders is made up of six connecting cylinders established on six battery holder levels; connecting bolts are inserted through each row of upper connecting cylinders and lower connecting cylinders, which are the partial-stack connecting cylinders; and each connecting bolt holds together six battery holder levels.

5. The battery system as cited in claim 2 wherein upper connecting cylinders and lower connecting cylinders are alternately disposed around the perimeter of the battery block.

6. The battery system as cited in claim 1 wherein connecting cylinders are formed as a single-piece with a battery holder.

7. The battery system as cited in claim 6 wherein a battery holder is made of plastic, and connecting cylinders are formed as a single-piece with the battery holder.

8. The battery system as cited in claim 1 wherein main bolts that have a larger diameter than the connecting bolts are inserted through all the battery holders of the battery block; and these main bolts pass through all of the stacked battery holders to hold all the battery holders in the stacked configuration.

9. The battery system as cited in claim 8 wherein the battery holder perimeters are provided with connecting cylinders for main bolt insertion and connecting cylinders for connecting bolt insertion.

10. The battery system as cited in claim 9 wherein connecting cylinders for main bolt insertion are formed as a single-piece with a battery holder in a manner protruding from both ends of the long side of the battery holder.

11. The battery system as cited in claim 10 wherein a battery holder is provided with connecting cylinders on both sides extending in the direction of battery holder stacking, and connecting cylinders for main bolt insertion at both ends of the long side of the battery holder.

12. The battery system as cited in claim 8 wherein the battery block has a base plate disposed on its bottom surface; and the main bolts pass through the base plate to attach the battery block to the base plate.

13. The battery system as cited in claim 12 wherein the sides of the battery holders are provided with electrode windows to expose battery module electrodes to the outside, and bus-bars are connected to the electrodes projecting through those electrode windows to electrically connect adjacent battery modules.

14. The battery system as cited in claim 1 wherein both sides of a battery holder is provided with a plurality of connecting cylinders.

15. The battery system as cited in claim 14 wherein connecting cylinders for main bolt insertion are disposed in a plurality of rows on the battery holders.

16. The battery system as cited in claim 1 wherein a plurality of circular cylindrical batteries are joined in a straight-line to form a battery module; and battery modules are arranged in parallel orientation between a pair of battery holders to form a battery unit.

17. The battery system as cited in claim 16 wherein a battery unit has a plurality of battery modules disposed in parallel orientation within a single plane and held in fixed positions by battery holders that sandwich the battery modules from above and below.

18. The battery system as cited in claim 1 installed on-board an electric-powered vehicle that supplies power to a motor to drive the vehicle.

19. The battery system as cited in claim 18 used in a power source apparatus for a hybrid car.

* * * * *